Jan. 3, 1967 J. WHITE 3,295,326
BREAKING OF SHEET ICE
Filed April 20, 1964 3 Sheets-Sheet 1
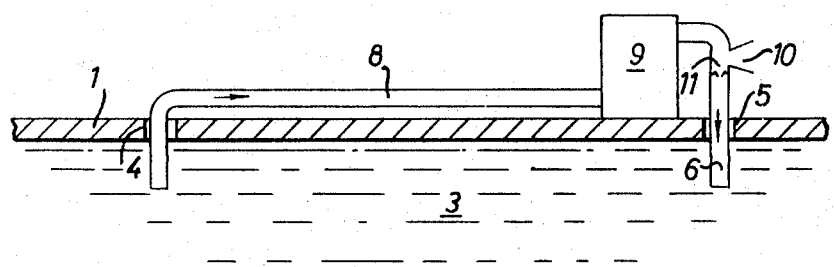
—FIG.1.—
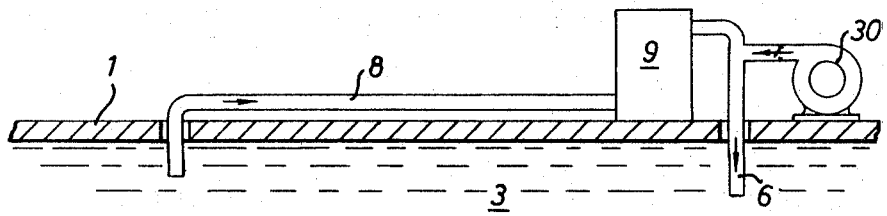
—FIG.2.—
INVENTOR:
JOHN WHITE
BY
Browne, Schuyler & Beveridge
ATTORNEYS

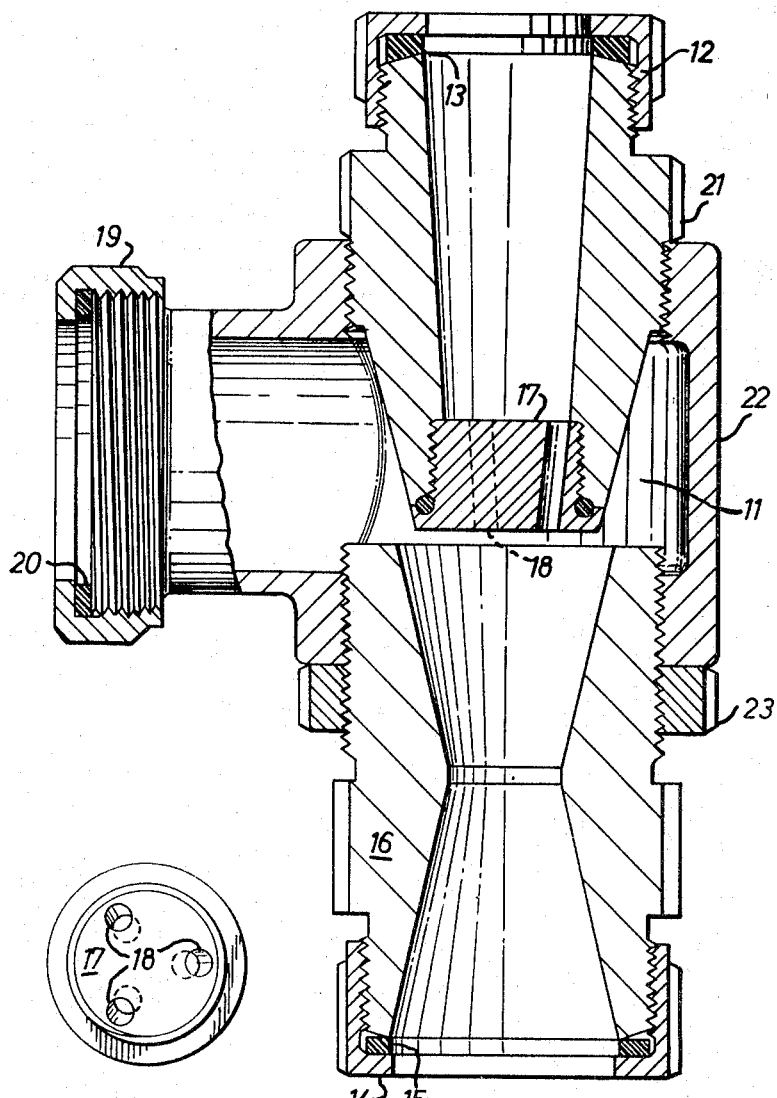

3,295,326
BREAKING OF SHEET ICE
John White, Birmingham, England, assignor to Horlicks Limited, Buckinghamshire, England, a British company
Filed Apr. 20, 1964, Ser. No. 361,113
Claims priority, application Great Britain, Apr. 26, 1963, 16,425/63
6 Claims. (Cl. 61—1)

The present invention relates to the breaking of sheet ice formed on the surface of bodies of water such as rivers and lakes and areas of sea as for example in estuaries or between an island and its mainland or between a group of islands.

One method of breaking sheet ice according to the present invention resides in pumping air through a hole in the ice into the water beneath the ice. According to another aspect of the invention sheet ice is broken by a method in which air and water are commonly fed into the body of water beneath the ice. According to another aspect of the invention a mixture of water and air is fed into the body of water beneath the ice. The air and water may be interspersed at a level either above or below the level the ice and then delivered into the body of water beneath the ice.

In one preferred mode of carrying the invention into effect air is dispersed into a stream of flowing water which is drawn from the body of water beneath the ice through a hole in the ice at one locality thereof and discharged in an aerated condition into the body of water through a hole in the ice at a second locality spaced from the first to result in breaking of the ice in a region between said localities and/or around one of them.

According to another aspect of the invention water is withdrawn from a body of water beneath a sheet of ice through a hole in the ice at one locality thereof and is discharged into the body of water through a hole at a second locality spaced from the first and air is dispersed into the water whilst flowing through a confined space to said second locality so that it is discharged into the body of water at said second locality in an aerated condition to result in breaking of the ice in a region between said localities and/or around one of them.

A further feature of the invention resides in discharging air or a mixture of water and air into the body of water in a turbulent and/or pulsating manner.

In carrying the invention into effect water and air may be interdispersed by forcing one of them through a nozzle into a venturi and by admitting the other into the venturi. The air or water may be fed to the nozzle at a pressure of from 30 to 100 lbs. per square inch gauge or at a pressure between 40 and 80 lbs. per square inch gauge. In one mode of carrying the invention into effect air is fed to the nozzle of a venturi at about 60 lbs. per square inch gauge and at a rate of about 150 cubic feet per minuate. In another mode of carrying the invention into effect air is forced under pressure into the water whilst flowing through a confined space such for example as a pipe leading to a hole in the ice; for example the air may be forced into the flowing water under a pressure of approximately 60 lbs. per square inch guage while the water is flowing under a pressure of 10 to 12 lbs. per square inch guage.

The present invention has been successfully employed to break ice approximately 18 inches thick on a lake approximately thirty feet deep. The ice was broken by performing the method of the present invention for a period of about 15 minutes with the aid of a water pump driven by a one horsepower motor, the air being dispersed into the water by means of an injector comprising a nozzle and venturi as above mentioned. The rate of flow of the water was approximately 10 gallons per minute and the water pressure behind the injector 10 lbs. per squre inch gauge. Holes in the ice were spaced apart by about thirty feet and the water was drawn through one hole and discharged in an aerated condition through the other into the body of water beneath the ice. The rate of dispersion of air into the water was about 2 cubic feet of air per minute.

An alternative method of breaking ice according to the present invention resides in pumping air through a hole in the ice directly into the water beneath the ice. The air is perferably pumped into the water so as to give rise to turbulence as may be achieved by virtue of a high rate of pumping of air into the water and/or by virtue of the mode by which the air is discharged into the water. In this modified method air may be pumped into the water through one or more holes in the ice at a given locality or through a number of holes at different localities.

A further feature of the invention resides in feeding air or a mixture of water and air into the body of water through a discharge pipe which extends some distance laterally beneath the ice away from the hole in the ice.

The invention is further described by way of example with reference to the accompanying drawings, in which:

FIG. 1 diagrammatically illustrates the method of the present invention when air is dispersed into flowing water by means of an injector;

FIG. 2 illustrates the method of the invention when air is forced into flowing water by means of a pump;

FIG. 3 illustrates one form of injector which may be used in conjunction with the method of FIG. 1;

FIG. 4 is a plan view illustrating the nozzle of the injector of FIG. 3; and

Figure 5:
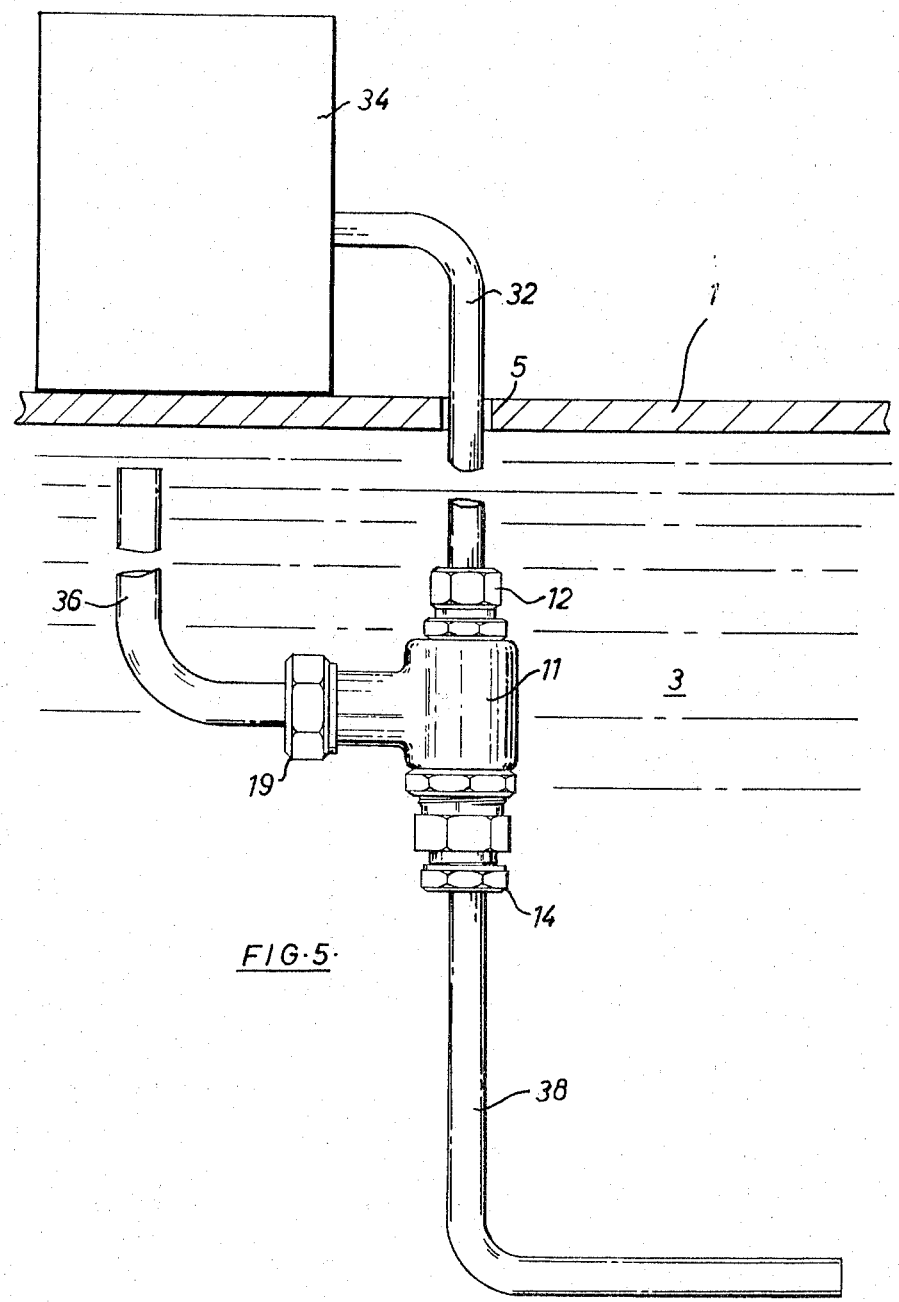
FIG. 5 illustrates a further method of performing the invention.

Referring to FIG. 1 the reference numeral 1 indicates a sheet of ice on a body of water 3 having two holes 4, 5 therein at localities which are spaced apart. The lefthand end of a suction pipe 8 enters the body of water 3 through the hole 4 and is connected at its righthand end to a pump 9, whose discharge pipe 6 enters the body of water 3 through hole 5. The pipe 6 is provided with an air inlet 10 and an injector 11 shown diagrammatically.

A suitable form of injector is illustrated in FIG. 3. The injector 11 illustrated in FIGS. 3 and 4 is connected with the upper part of pipe 6 by nut 12 and inlet joint ring 13 and to the lower part of pipe 6 by nut 14 and outlet joint ring 15. The water is fed to the venturi 16 through a nozzle formed by a plate 17 with three holes 18 which are inwardly directed to the throat of the venturi 16. More or less than three such holes 18 may if desired be provided. A plate 17 with six such holes can be used with advantage. An inlet air pipe (not shown) is connected to the injector by nut 19 and air inlet joint ring 20. The water inlet member 21 is connected to the venturi 16 by a threaded pipe member 22 and locknut 23, this arrangement enabling the position of the perforated plate 17 to be adjusted axially to the most suitable spacing from the throat of the venturi 16. If desired two or more separate outlet pipes 6 each having a separate pump 9 may be commonly connected to the suction pipe 8, each such outlet pipe being provided with its own separate injector.

FIG. 2 illustrates an alternative mode of carrying the invention into effect in which air is dispersed into the water flowing downwardly through the pipe 6 by means of a pump 30 which forces air under pressure into the pipe 6 near its upper end. The pump 30 may deliver air at say 60 lbs. per square inch gauge to the water inlet member 21 of an injector as illustrated in FIGS. 3 and 4 and the pump 9 may deliver water at a pressure of say 10 to 12 lbs. per square inch gauge to the nut 19 to achieve interdispersion of the water and air in the venturi 16.

A further feature of the invention resides in the dispersion of air into the water whilst the water is flowing downwardly prior to its discharge into the water body, as shown in FIGS. 1 and 2.

In the mode of performing the invention illustrated in FIG. 5 an injector 11 similar to that illustrated in FIGS. 3 and 4 is supported in the body of water 3 beneath a sheet of ice 1 by means of an air pipe 32 passing through a hole 5 in the ice and connected at its upper end to a reciprocating air pump 34 and connected at its lower end to the injector 11 by nut 12. A water inlet pipe 36 is connected to the injector 11 by nut 19 and a discharge pipe 38 is connected to the injector 11 by nut 14. The discharge pipe 38 is angled so as to discharge away from the hole 5 in a direction opposite to that of the water inlet pipe 36. The water inlet pipe 36 is angled upwardly to increase the spacing of its inlet end from the discharge end of the discharge pipe 38.

In the arrangement illustrated in FIG. 5 water is induced by the airflow as compared with that of FIG. 1 where air is induced by the water-flow. Moreover in the arrangement of FIG. 5 the interdispersion of air and water is achieved in the body of water 3 beneath the sheet of ice 1. For the feed of air instead of water to the nozzle the spacing of the venturi 16 from the nozzle plate 17 can be suitably adjusted and of course the plate 17 can be exchanged for another having a different set of holes 18.

If desired a baffle or baffles may be provided at the discharge end of the pipe 6 or 38 in order to induce or enhance turbulence.

The present invention includes the maintenance of sea lanes, lake lanes, river routes and the like in navigable condition by the employment of the present invention. This may be achieved by feeding air or a mixture of water and air into the body of water from a number of fixed installations for example pontoons and/or stagings and/or islands disposed at spaced intervals on or in the body of water or by delivering air or a mixture of water and air into the body of water at spaced localities from an installation, for example a floating vessel or a sledge, capable of being progressed through the water or along the ice from one locality to another.

The invention also includes the maintenance of animal life in a body of water under conditions of frost by breaking sheet ice as hereinbefore described.

The invention furthermore includes the feeding of air or a mixture of water and air into a body of water to prevent the formation of ice thereon. This may be very desirable for example in the neighborhood of valves and sluices in fresh water reservoirs.

I claim:
1. A method of breaking ice formed on the surface of a body of water in which water is drawn from the body of water at one locality beneath the ice and is discharged into the body of water at a second locality beneath the ice horizontally spaced from the first locality and air is mixed with the water drawn at said one locality before it is discharged at said second locality.

2. A method of breaking sheet ice formed on the surface of a body of water in which air is dispersed into a stream of flowing water which is drawn from the body of water beneath the ice through a hole in the ice at one locality thereof and fed into the body of water through a hole in the ice at a second locality spaced from the first and is aerated before it is discharged into the body of water.

3. A method according to claim 2 in which the flowing water is aerated at a level below the level of the ice.

4. A method according to claim 2 in which the water is withdrawn from and discharged into the body of water by a pump driven by approximately one horse power.

5. A method according to claim 4 in which the pump delivers approximately 10 gallons of water per minute at a pressure of about 10 lbs. per square inch gauge to the nozzle of an injector at which air is dispersed into the water and from which aerated water is fed into the body of water beneath the ice.

6. A method of breaking sheet ice formed on the surface of a body of water in which water is withdrawn from the body of water through a hole in the ice at one locality thereof and is discharged into the body of water through a hole at a second locality spaced from the first and air is dispersed into the water while flowing through a confined space to said second locality.

References Cited by the Examiner
UNITED STATES PATENTS

| | | | |
|---|---|---|---|
| 2,020,850 | 11/1935 | Myhren et al. | |
| 2,235,357 | 3/1941 | Conklin | 261—77 X |
| 2,241,337 | 5/1941 | Work | 261—77 |
| 2,417,519 | 3/1947 | Persson et al. | 61—1 |
| 3,067,435 | 12/1962 | Nash | 261—77 X |
| 3,068,655 | 12/1962 | Murray et al. | 61—6 |
| 3,109,288 | 11/1963 | Gross | 61—1 |
| 3,192,898 | 7/1965 | Oster | 61—1 X |

OTHER REFERENCES

Changing Our Climate by Camille Rougeron; The Detroit News, December 19, 1957, two pages (46 at top).

EARL J. WITMER, *Primary Examiner.*